(12) United States Patent
Fujii

(10) Patent No.: US 11,196,071 B2
(45) Date of Patent: Dec. 7, 2021

(54) METHOD FOR MANUFACTURING MEMBRANE ELECTRODE AND GAS DIFFUSION LAYER ASSEMBLY

(71) Applicant: TOYOTA JIDOSHA KABUSHIKI KAISHA, Toyota (JP)

(72) Inventor: Kazuki Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/996,319

(22) Filed: Aug. 18, 2020

(65) Prior Publication Data

US 2021/0119236 A1    Apr. 22, 2021

(30) Foreign Application Priority Data

Oct. 18, 2019  (JP) .............................. JP2019-190628

(51) Int. Cl.
*H01M 4/88*    (2006.01)
*H01M 8/1004*    (2016.01)

(52) U.S. Cl.
CPC ....... *H01M 8/1004* (2013.01); *H01M 4/8807* (2013.01); *H01M 4/8882* (2013.01); *H01M 4/8896* (2013.01)

(58) Field of Classification Search
None
See application file for complete search history.

(56) References Cited

U.S. PATENT DOCUMENTS

2014/0205932 A1* 7/2014 Hori .................... H01M 4/8668
429/530

FOREIGN PATENT DOCUMENTS

JP    2015035256 A  *  2/2015
JP    2019079671 A     5/2019

OTHER PUBLICATIONS

JP-2015035256-A—machine translation (Year: 2015).*

* cited by examiner

*Primary Examiner* — Haroon S. Sheikh
(74) *Attorney, Agent, or Firm* — Hunton Andrews Kurth LLP

(57) ABSTRACT

A method for manufacturing a membrane electrode and gas diffusion layer assembly includes: applying a catalyst ink including an ionomer to a second surface of an electrolyte membrane while conveying a first sheet in which a first surface of the electrolyte membrane is supported by a back sheet; drying the catalyst ink by blowing air vibrated with ultrasonic waves onto a surface of the catalyst ink to produce a second sheet in which a catalyst layer is provided on the second surface of the electrolyte membrane; forming a first roll by winding the second sheet; and producing a third sheet by stacking a gas diffusion layer on the catalyst layer and pressing them in a stacking direction as heating to join the catalyst layer and the gas diffusion layer while conveying the second sheet unwound from the first roll.

3 Claims, 6 Drawing Sheets

| SAMPLE NAME | Ew | DRYING METHOD | IONOMER RATIO | FIRST INTERFACE STRENGTH (N/m) | SECOND INTERFACE STRENGTH (N/m) |
|---|---|---|---|---|---|
| SAMPLE 1 | 1000 | ULTRASONIC | 1.7 | 5 | 36 |
| SAMPLE 2 | 800 | ULTRASONIC | 1.7 | 20 | 30 |
| SAMPLE 3 | 1000 | NORMAL | 1.0 | 5 | 29 |
| SAMPLE 4 | 800 | NORMAL | 1.0 | 23 | 6 |

METHOD FOR MANUFACTURING MEMBRANE ELECTRODE AND GAS DIFFUSION LAYER ASSEMBLY

INCORPORATION BY REFERENCE

The disclosure of Japanese Patent Application No. 2019-190628 filed on Oct. 18, 2019 including the specification, drawings and abstract is incorporated herein by reference in its entirety.

BACKGROUND

1. Technical Field

The present disclosure relates to a method for manufacturing a membrane electrode and gas diffusion layer assembly.

2. Description of Related Art

There is a known method for producing a membrane electrode and gas diffusion layer assembly (MEGA). In the method, a catalyst layer and a gas diffusion layer are joined together while an electrolyte membrane sheet having the catalyst layer on a first side of an electrolyte membrane and a support sheet that supports a second side of the electrolyte membrane are conveyed by a roll-to-roll method, so that the membrane electrode and gas diffusion layer assembly is produced (see, for example, Japanese Unexamined Patent Application Publication No. 2019-79671 (JP 2019-79671 A)).

SUMMARY

When the MEGA is produced using the electrolyte membrane supported by the support sheet, the support sheet is peeled off from the electrolyte membrane during the MEGA production process in order to form the catalyst layers on both sides of the electrolyte membrane. At this time, the electrolyte membrane and the catalyst layer may be pulled together with the support sheet, and peeling may occur between the catalyst layer and the gas diffusion layer. The inventors have found that when an electrolyte membrane having a small equivalent weight (Ew), which is the dry mass of the electrolyte per 1 mol of sulfo group, is used in order to improve the performance of the MEGA, in particular, the peel strength between the electrolyte membrane and the support sheet may become large, so the peeling mentioned above is likely to occur.

(1) An aspect of the disclosure relates to a method for manufacturing a membrane electrode and gas diffusion layer assembly. The method includes: applying a catalyst ink including an ionomer to a second surface of an electrolyte membrane while conveying a first sheet in which a first surface of the electrolyte membrane is supported by a back sheet; drying the catalyst ink by blowing air vibrated with ultrasonic waves onto a surface of the catalyst ink to produce a second sheet in which a catalyst layer is provided on the second surface of the electrolyte membrane; forming a first roll by winding the second sheet; and producing a third sheet by stacking a gas diffusion layer on the catalyst layer and pressing the catalyst layer and the gas diffusion layer in a stacking direction as heating the catalyst layer and the gas diffusion layer to join the catalyst layer and the gas diffusion layer while conveying the second sheet unwound from the first roll. With the method according to the above aspect, the catalyst ink containing ionomers is rapidly dried by the air vibrated by ultrasonic waves to form the catalyst layer. Thus, it is possible to cause the ionomers to be segregated toward the side of the catalyst layer on which the gas diffusion layer is stacked. As a result, a peel strength between the catalyst layer and the gas diffusion layer is improved. Thus, it is possible to suppress occurrence of peeling between the catalyst layer and the gas diffusion layer when the back sheet is peeled off.

(2) In the method according to the above aspect, after producing the third sheet, the back sheet may be peeled off from the third sheet to form a fourth sheet, and the fourth sheet may be wound into a roll shape to form a second roll. With the method according to the above configuration, it is possible to suppress occurrence of peeling between the catalyst layer and the gas diffusion layer, when the back sheet is peeled off from the third sheet while the third sheet is being conveyed.

(3) In the method according to the above aspect, an equivalent weight, which is a dry mass of electrolyte per 1 mol of sulfo group in the electrolyte membrane, of the electrolyte membrane may be such a value that a first peel strength between the back sheet and the electrolyte membrane is smaller than a second peel strength between the catalyst layer and the gas diffusion layer. With the manufacturing method according to the above configuration, it is possible to suppress occurrence of peeling between the catalyst layer and the gas diffusion layer, when the back sheet is removed. The present disclosure can be realized in various forms, and can be realized by, for example, a method for manufacturing a fuel cell including a membrane electrode and gas diffusion layer assembly, a membrane electrode and gas diffusion layer assembly, a fuel cell including a membrane electrode and gas diffusion layer assembly, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
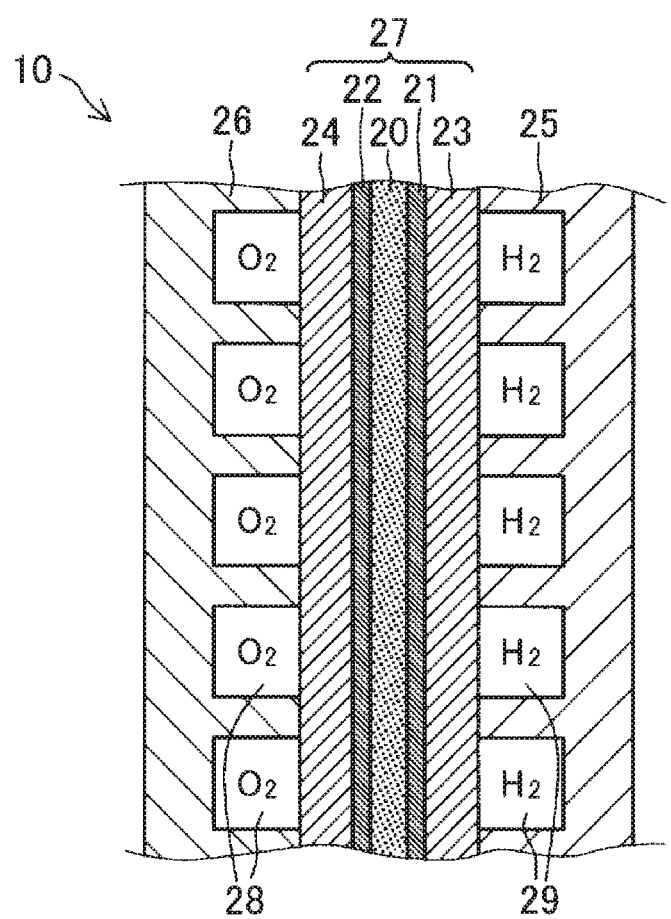
FIG. 1 is a schematic sectional view showing a schematic configuration of a unit cell of a fuel cell.

FIG. 1 is a schematic sectional view showing a schematic configuration of a unit cell of a fuel cell. The fuel cell of the present embodiment is a polymer electrolyte fuel cell that is supplied with a fuel gas containing hydrogen and an oxidizing gas containing oxygen to generate electricity. The fuel cell is configured by stacking a plurality of unit cells 10.

The unit cell 10 includes a membrane electrode and gas diffusion layer assembly (MEGA) 27 and a pair of gas separators 25, 26 between which the MEGA 27 is sandwiched. The MEGA 27 includes an electrolyte membrane 20, an anode 21 and a cathode 22 that are electrode catalyst layers provided on the opposite sides of the electrolyte membrane 20, a gas diffusion layer 23 joined to a surface of the anode 21 on the opposite side from the electrolyte membrane 20, and a gas diffusion layer 24 joined to a surface of the cathode 22 on the opposite side from the electrolyte membrane 20.

The electrolyte membrane 20 is an ion exchange membrane made of a polymer electrolyte material (electrolyte resin) and having proton conductivity, and exhibits good electric conductivity in a wet state. As the electrolyte membrane 20, for example, a membrane made of a perfluorosulfonic acid polymer having sulfo group ($-SO^3H$ group) at a side chain terminal can be used.

The amount of sulfo group contained in the electrolyte membrane 20 can be represented by an equivalent weight (Ew). The Ew is the dry mass of the electrolyte per 1 mol of sulfo group. Thus, the smaller the value of the Ew, the higher the concentration of the sulfo group contained in the electrolyte membrane 20. The Ew is measured by, for example, an acid-base titration method. Herein, the unit g/mol of the Ew may be omitted as in Ew=800. For example, Ew=800 represents that the Ew is 800 g/mol, which means that the dry mass of the electrolyte per 1 mol of sulfo group is 800 g.

The anode 21 and the cathode 22 each include carbon particles carrying catalytic metal that causes electrochemical reaction to proceed, and ionomers that are polymer electrolyte (electrolyte resin) having proton conductivity. As the catalyst metal, for example, platinum or a platinum alloy of platinum and another metal such as ruthenium can be used. As the ionomer, for example, a perfluorosulfonic acid polymer having sulfo group ($-SO^3H$ group) at a side chain terminal can be used. The ionomer included in the anode 21 and the cathode 22 may be the same kind of polymer electrolyte as the polymer electrolyte constituting g the electrolyte membrane 20, or may be a different kind of polymer electrolyte.

The gas diffusion layers 23, 24 are each made of a member having gas permeability and electron conductivity. In the present embodiment, the gas diffusion layers 23, 24 are each made of a carbon member such as carbon cloth and carbon paper. A microporous layer (MPL) may be provided on the surface of the gas diffusion layers 23 that is in contact with the anode 21, and may be provided on the surface of the gas diffusion layer 24 that is in contact with the cathode 22.

The gas separators 25, 26 are each made of a gas-impermeable conductive member that is a carbon member such as packed carbon made by compressing a carbon material so that the carbon material becomes gas-impermeable or a metal member such as press-formed stainless steel, for example. A flow path groove 28 is provided on a surface of the gas separator 26, which faces the gas diffusion layer 24, and a flow path groove 29 is provided on a surface of the gas separator 25, which faces the gas diffusion layer 23. A reaction gas (oxidizing gas) flows through the flow path groove 28 and a reaction gas (fuel gas) flows through the flow path groove 29. In addition, a porous body for forming a gas flow path may be provided between the gas separator 25 and the gas diffusion layer 23 and between the gas separator 26 and the gas diffusion layer 24. In this case, the flow path grooves 28, 29 may be omitted.

Figure 2:
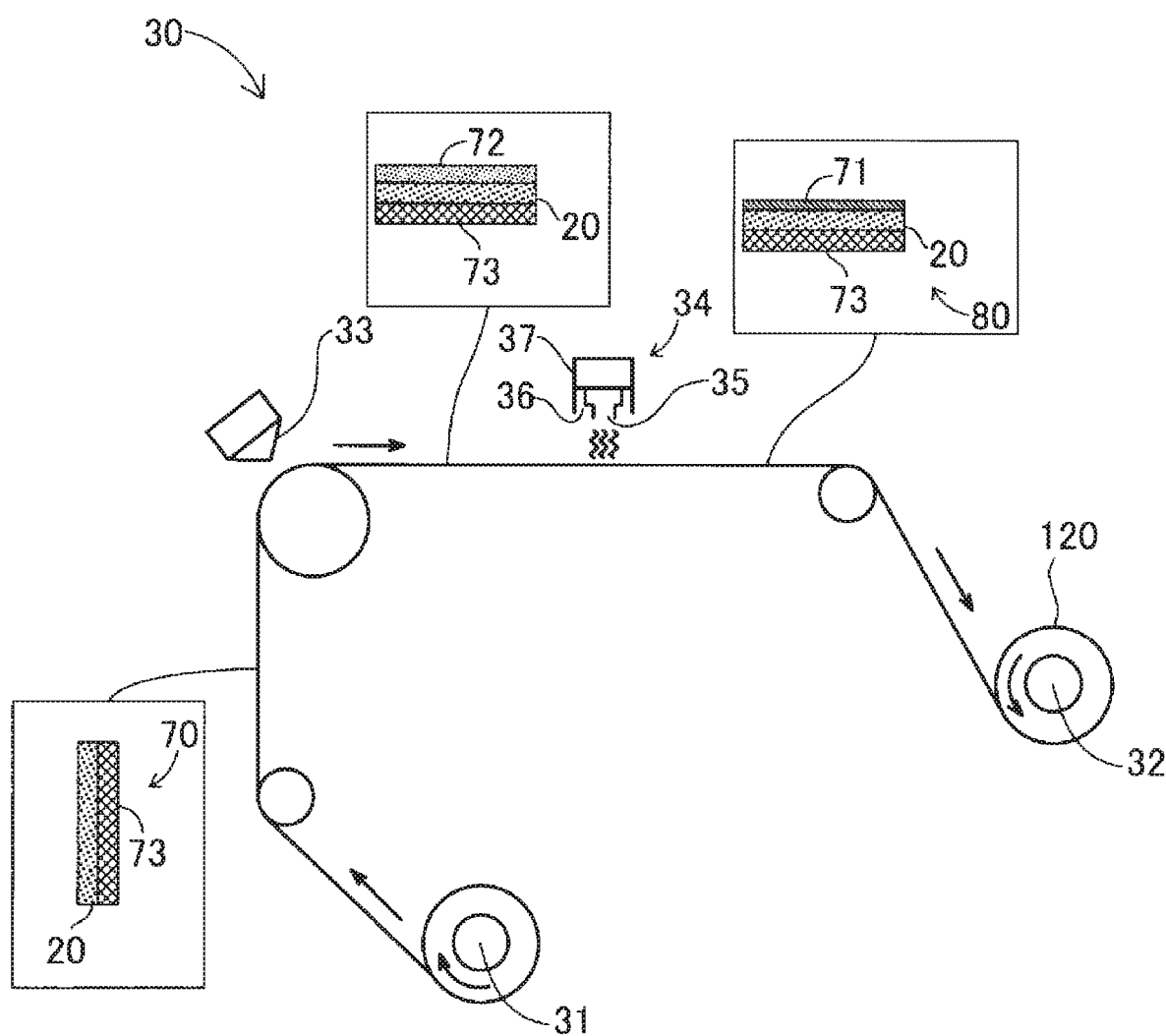
FIG. 2 is a schematic diagram showing a catalyst layer forming apparatus used for manufacturing a membrane electrode and gas diffusion layer assembly (MEGA)

FIG. 2 is a schematic diagram showing a catalyst layer forming apparatus 30 used for manufacturing the MEGA 27. The catalyst layer forming apparatus 30 includes a first unwinding roller 31, a first winding roller 32, an application nozzle 33, and an ultrasonic nozzle 34.

The first unwinding roller 31 is a roller that unwinds a first sheet 70 having a first surface of the electrolyte membrane 20 supported by a back sheet 73. The first winding roller 32 is a roller that winds a second sheet 80 having a catalyst layer 71 provided on the first sheet 70 to form a first roll 120.

The application nozzle 33 is a nozzle that sprays catalyst ink onto the first sheet 70 unwound from the first unwinding roller 31. A layer formed of the catalyst ink sprayed on the first sheet 70 is referred to as a catalyst layer precursor 72. The catalyst layer 71 is formed by drying the catalyst layer precursor 72.

The ultrasonic nozzle 34 is a nozzle that blows air vibrated with ultrasonic waves onto the catalyst layer precursor 72 formed on the first sheet 70 to dry the catalyst layer precursor 72. By drying the catalyst layer precursor 72, the second sheet 80 having the catalyst layer 71 formed on the first sheet 70 is produced. Specifically, the ultrasonic nozzle 34 includes an outlet 35, a suction portion 36, and a heater 37. While ultrasonically vibrating air heated by the heater 37 and blowing the air from the outlet 35 onto the catalyst ink, the ultrasonic nozzle 34 suctions components volatilized from the catalyst ink with the suction portion 36 to efficiently dry the catalyst ink.

Figure 3:
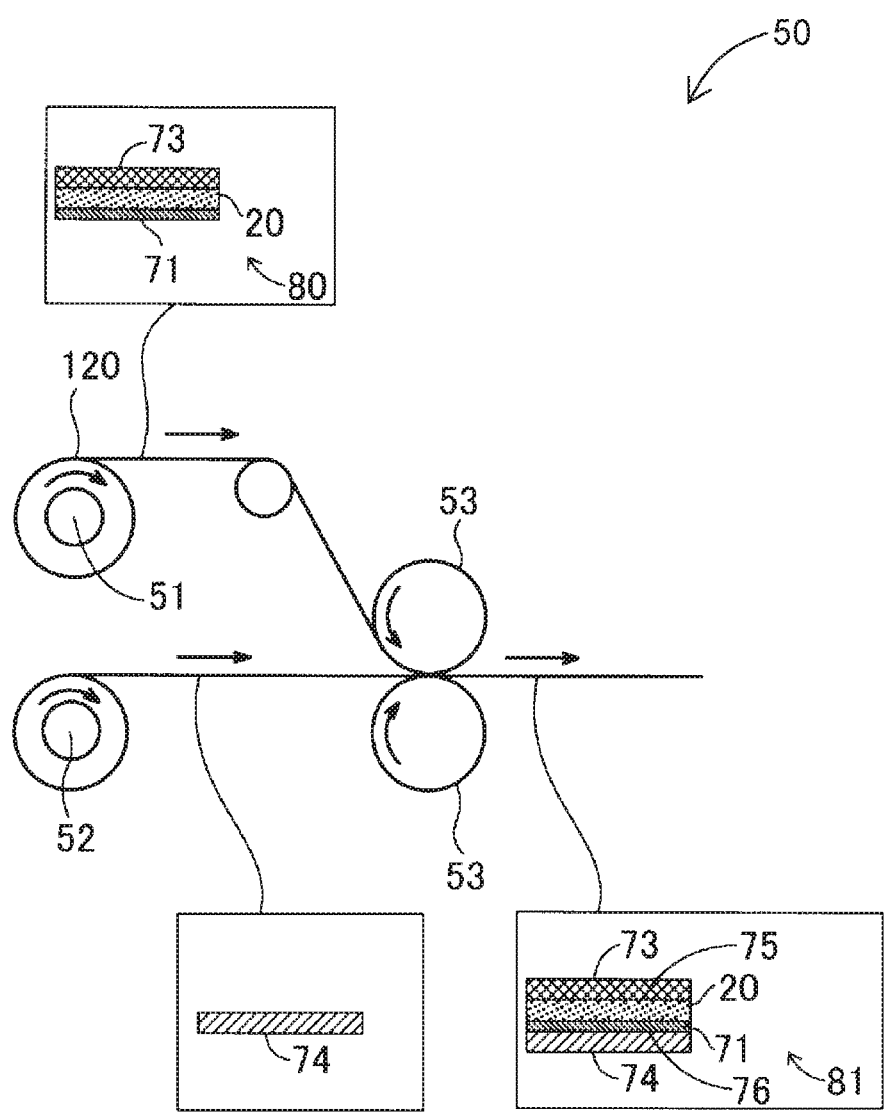
FIG. 3 is a schematic diagram showing a joining apparatus used for manufacturing the MEGA.

FIG. 3 is a schematic diagram showing a joining apparatus 50 used for manufacturing the MEGA 27. The joining apparatus 50 includes a second unwinding roller 51, a third unwinding roller 52, and joining rollers 53.

The second unwinding roller 51 is a roller that unwinds the second sheet 80 from the first roll 120. The third unwinding roller 52 is a roller that unwinds a gas diffusion layer 74 that is to be joined to the second sheet 80. The joining rollers 53 are rollers that stack the gas diffusion layer 74 unwound from the third unwinding roller 52 on the catalyst layer 71 of the second sheet 80 unwound from the second unwinding roller 51, sandwich the catalyst layer 71 and the gas diffusion layer 74 from the opposite side each other in a stacking direction, and press the catalyst layer 71 and the gas diffusion layer 74 in the stacking direction while heating to join the catalyst layer 71 and the gas diffusion layer 74, thereby producing a third sheet 81.

Figures 4, 5:
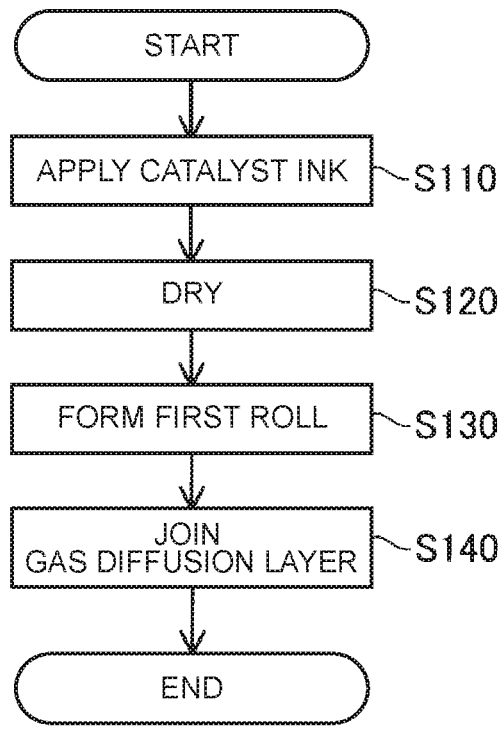
FIG. 4 is a flowchart illustrating a method for manufacturing the MEGA according to a first embodiment.
FIG. 5 is a diagram showing results of a peeling test.

FIG. 4 is a flowchart illustrating a method for manufacturing the MEGA 27 with the catalyst layer forming apparatus 30 shown in FIG. 2 and the joining apparatus 50 shown in FIG. 3.

In the manufacturing method of the present embodiment, first, while the first sheet 70 is being unwound from the first unwinding roller 31, the catalyst ink is applied to the surface of the electrolyte membrane 20 constituting the first sheet 70 by the application nozzle 33 (step S110). Specifically, since the first surface of the electrolyte membrane 20 is supported by the back sheet 73, the catalyst ink is applied to a second surface of the electrolyte membrane 20. As a result, the catalyst layer precursor 72 is formed on the first sheet 70. Note that, step S110 may be referred to as a first process.

The electrolyte membrane 20 of the first sheet 70 that is unwound from the first unwinding roller 31 is made by processing a fluorine-based ion exchange resin into a strip shape. In the present embodiment, the electrolyte membrane 20 is formed by impregnating a stretched and porous polytetrafluoroethylene (PTFE) sheet with an ion exchange resin.

That is, the electrolyte membrane 20 of the present embodiment is a reinforced electrolyte membrane reinforced by the PTFE sheet. The back sheet 73 that supports the electrolyte membrane 20 is made from PTFE or the like that has excellent heat resistance and chemical resistance. In this embodiment, the thickness of the electrolyte membrane 20 is in a range of 5 µm to 30 µm.

The catalyst ink is made by, for example, dispersing powder carbon such as acetylene black that carries a catalyst made of platinum or an alloy of platinum and another metal such as ruthenium and ionomers in a solvent such as water, alcohol, etc.

Next, the catalyst ink applied to the first sheet 70 in step S110 is ultrasonically dried by the ultrasonic nozzle 34 (step S120). When the catalyst ink is dried, the catalyst layer 71 is formed on the first sheet 70, and thus, the second sheet 80 is produced. Note that, step S120 may be referred to as a second process.

Next, the first roll 120 is formed by winding the second sheet 80 produced in step S120 with the first winding roller 32 (step S130). Note that, step S130 may be referred to as a third process. The first roll 120 produced in step S130 is attached to the second unwinding roller 51 shown in FIG. 3. At this time, for example, a robot may detach the first roll 120 from the first winding roller 32, convey the first roll 120 while supporting, and attach the first roll 120 to the second unwinding roller 51. Note that performing processing etc. while conveying a workpiece unwound from a roll and winding the workpiece again into a roll shape as in steps S110 to S120 in the present embodiment may be referred to as a "roll-to-roll method".

Next, with the joining rollers 53, the gas diffusion layer 74 unwound from the third unwinding roller 52 is stacked on the catalyst layer 71 of the second sheet 80 unwound from the first roll 120 attached to the second unwinding roller 51, and the catalyst layer 71 and the gas diffusion layer 74 are joined together to form the third sheet 81 (step S140). In the present embodiment, the catalyst layer 71 and the gas diffusion layer 74 are joined together with the joining rollers 53 kept at 140° C. and a load of 9.4 kN applied. Note that, step S140 may be referred to as a fourth process. Further, in the third sheet 81, an interface between the back sheet 73 and the electrolyte membrane 20 may be referred to as a first interface 75, and an interface between the catalyst layer 71 and the gas diffusion layer 74 may be referred to as a second interface 76.

After that, the back sheet 73 is peeled off from the third sheet 81, another catalyst layer is disposed on the surface of the third sheet 81 from which the back sheet 73 is peeled off, and a gas diffusion layer is disposed on the other catalyst layer. Thus, the MEGA 27 is completed. The unit cell 10 is produced by sandwiching the MEGA 27 between the gas separators 25, 26. Moreover, a fuel cell is completed by stacking the plurality of unit cells 10.

FIG. 5 is a diagram showing results of a peeling test of the third sheet 81 produced by the manufacturing method shown in FIG. 4.

The following third sheets were produced as samples for performing the peeling test. Note that Sample 3 and Sample 4 were produced to compare the effects due to a difference in drying method. In addition, the Ew of the electrolyte membrane 20 used to produce each sample was measured by the acid-base titration method.

<Sample 1> A third sheet produced by the above-described manufacturing method using the electrolyte membrane 20 having Ew=1000, in which ultrasonic drying is performed in step S120.

<Sample 2> A third sheet produced by the above-described manufacturing method using the electrolyte membrane 20 having Ew=800, in which ultrasonic drying is performed in step S120.

<Sample 3> A third sheet produced by the above-described manufacturing method using the electrolyte membrane 20 having Ew=1000, in which normal drying is performed rather than ultrasonic drying in step S120.

<Sample 4> A third sheet produced by the above-described manufacturing method using the electrolyte membrane 20 having Ew=800, in which normal drying is performed rather than ultrasonic drying in step S120.

The normal drying refers to a drying by heating with a heater. Specifically, in the drying process of step S120, the catalyst layer precursor 72 on the first sheet 70 was heated and dried by the heater disposed above the first sheet 70, so that the catalyst layer 71 was formed on the first sheet 70. The surface temperature of the catalyst layer precursor 72 during the normal drying was set to 85° C. In the ultrasonic drying, the nozzle internal pressure was set to 17 kPa and the suction pressure of the suction portion was set to 0.5 kPa. The surface temperature of the catalyst layer precursor 72 during the ultrasonic drying was set to 70° C.

The ionomer ratio shown in FIG. 5 is a ratio of the weight concentration of the ionomers present on the second interface 76 side in the catalyst layer 71 to the weight concentration of the ionomers present on the first interface 75 side in the electrolyte membrane 20. The weight concentration of the ionomers of each sample was measured by energy dispersive X-ray (EDX) analysis. The ionomer ratios of Sample 1 and Sample 2 were both 1.7. The ionomer ratios of Sample 3 and Sample 4 were both 1.0.

A first interface strength in FIG. 5 is a peel strength at the first interface 75, and a second interface strength is a peel strength at the second interface 76. The peel strength at each interface of each sample was measured by a 90° peel test. Regarding Sample 1 and Sample 3 produced using the electrolyte membrane 20 having Ew=1000, the second interface strength was larger than the first interface strength. Regarding Sample 4, the second interface strength was smaller than the first interface strength. Regarding Sample 2, the second interface strength was larger than the first interface strength, although the electrolyte membrane having Ew=800 was used as in Sample 4.

From the above results, it is considered that in Sample 3 and Sample 4, the ionomers segregated toward the second interface side in the catalyst layer 71 due to ultrasonic drying, and the ionomers that segregated toward the second interface side interacted with the gas diffusion layer 74 so that the second interface strength was improved.

The first interface strength of Sample 2 was larger than the first interface strength of Sample 1. The first interface strength of Sample 4 was larger than the first interface strength of Sample 3. This is considered to be due to the fact that the amount of sulfo group contained in the electrolyte membranes 20 of Sample 2 and Sample 4 was larger than the amount of sulfo group contained in the electrolyte membranes 20 of Sample 1 and Sample 3, so the interaction between the electrolyte membrane 20 and the back sheet 73 at the first interface 75 was promoted in Sample 2 and Sample 4.

The lower the Ew of the electrolyte membrane 20 is, the larger the amount of sulfo group contained in the electrolyte membrane 20 is, so that the first interface strength is improved. Thus, by producing the MEGA 27 using the electrolyte membrane 20 having such Ew that the first interface strength of the MEGA 27 produced by the above manufacturing method is smaller than the second interface strength, it is possible to effectively suppress occurrence of peeling at the second interface 76 when the back sheet 73 is peeled off from the electrolyte membrane 20.

Even when the second interface strength and the first interface strength are equal to each other or the second interface strength is smaller than the first interface strength, it is possible to suppress the occurrence of peeling at the second interface 76 when the back sheet 73 is peeled off, by making the first interface strength relatively small using ultrasonic drying in the above manufacturing method.

In the method for manufacturing the membrane electrode and gas diffusion layer assembly according to the present embodiment described above, the second sheet 80 is produced by drying the catalyst layer precursor 72 by ultrasonic drying. Thus, due to ultrasonic drying, the ionomers contained in the catalyst ink segregate toward the second interface side in the catalyst layer 71 and the ionomers that has segregated interact with the gas diffusion layer 74, so that the peel strength of the second interface can be improved. By improving the peel strength of the second interface 76, the relative peel strength of the first interface 75 can be reduced, and when peeling off the back sheet 73, it is possible to suppress the occurrence of peeling at the second interface 76.

In addition, by producing the MEGA 27 using the electrolyte membrane 20 having such Ew that the first interface strength of the MEGA 27 produced by the above manufacturing method is smaller than the second interface strength, it is possible to effectively suppress occurrence of peeling at the second interface 76 when the back sheet 73 is peeled off from the electrolyte membrane 20.

B. Second Embodiment

Figure 6:
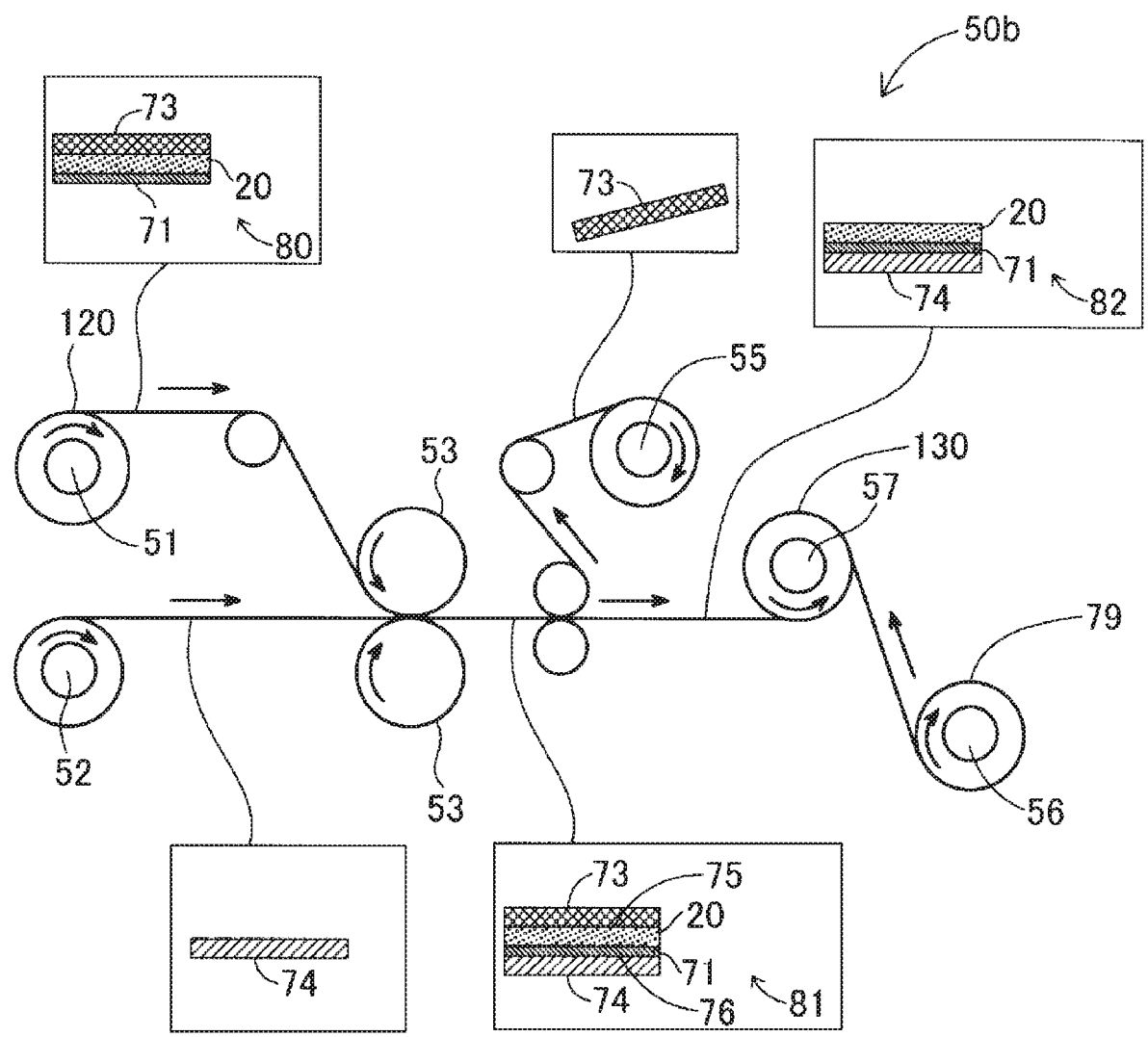
FIG. 6 is a schematic diagram showing a joining apparatus used for manufacturing the MEGA according to a second embodiment.

FIG. 6 is a schematic diagram showing a joining apparatus 50b used for manufacturing the MEGA 27 in a second embodiment. The joining apparatus 50b further includes a second winding roller 55, a fourth unwinding roller 56, and a third winding roller 57, in addition to the configuration of the joining apparatus 50 in the first embodiment shown in FIG. 3. In the second embodiment, the configuration of the catalyst layer forming apparatus 30 is the same as that in the first embodiment, and thus the description thereof will be omitted.

The second winding roller 55 is a roller that peels off the back sheet 73 from the third sheet 81 and winds the back sheet 73. The fourth unwinding roller 56 is a roller that unwinds a slip sheet 79. The third winding roller 57 is a roller that winds a fourth sheet 82 made by peeling off the back sheet 73 from the third sheet 81 while stacking the slip sheet 79 unwound from the fourth unwinding roller 56 on the fourth sheet 82 such that the slip sheet 79 is sandwiched between surfaces of the fourth sheet 82 of adjacent turns. The slip sheet 79 suppresses sticking between the surfaces of the fourth sheet 82 of adjacent turns and protects the surfaces of the fourth sheet 82.

Figure 7:
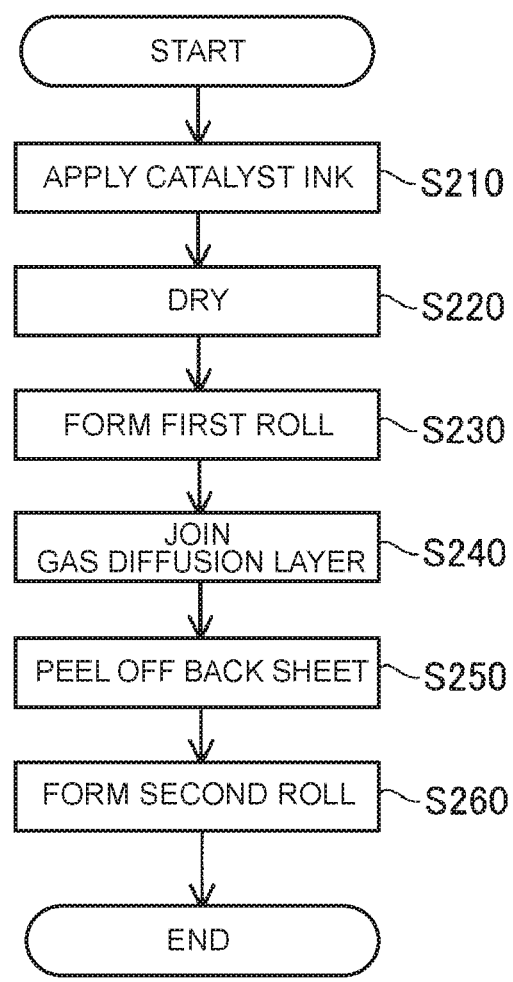
FIG. 7 is a flowchart illustrating a method for manufacturing the MEGA according to the second embodiment.

FIG. 7 is a flowchart illustrating the method for manufacturing the MEGA 27 according to the second embodiment. Note that steps S210 to S240 are the same as steps S110 to S140 in the first embodiment shown in FIG. 4, so description thereof will be omitted.

With the second winding roller 55, the back sheet 73 is peeled off from the third sheet 81 formed in step S240 and wound (step S250). At this time, the back sheet 73 is peeled off from the third sheet 81 so that the fourth sheet 82 is formed.

The fourth sheet 82 is wound by the third winding roller 57 to form a second roll 130 (step S260). At this time, the second roll 130 is formed as the slip sheet 79 is stacked on the fourth sheet 82 such that the slip sheet 79 is sandwiched between the surfaces of the fourth sheet 82 of adjacent turns. Thus, the slip sheet 79 is interposed between the surfaces of the fourth sheet 82 of adjacent turns. Note that steps S240 to S260 in the present embodiment are processes of the roll-to-roll method.

In the method for manufacturing a membrane electrode and gas diffusion layer assembly according to the present embodiment described above, the fourth sheet 82 is formed by peeling off the back sheet 73 from the third sheet 81 and the fourth sheet 82 is wound into a roll shape to form the second roll 130. Therefore, when the back sheet 73 is peeled off from the third sheet 81 while the third sheet 81 is being conveyed, it is possible to suppress occurrence of peeling between the catalyst layer 71 and the gas diffusion layer 74.

C. Other Embodiments (C1) In the above embodiment, the first sheet 70 is unwound from the first unwinding roller 31. However, the first unwinding roller 31 need not be provided. For example, the catalyst ink may be sprayed onto the first sheet 70 while the first sheet 70 that is not wound into a roll shape and having a thin film shape is conveyed.

(C2) In the above embodiment, in step S260, the third winding roller 57 winds the fourth sheet 82 with the slip sheet 79 stacked thereon such that the slip sheet 79 is sandwiched between the surfaces of the fourth sheet 82 of adjacent turns, so as to form the second roll 130. However, the slip sheet 79 need not be sandwiched between the surfaces of the fourth sheet 82 of adjacent turns when the second roll 130 is formed. For example, the third winding roller 57 may wound the fourth sheet 82 without winding the slip sheet 79 to form the second roll 130.

The disclosure is not limited to the above-described embodiments, and can be implemented with various configurations without departing from the scope of the disclosure. For example, the technical features in the embodiments corresponding to the technical features in the aspects described in the summary can appropriately be replaced or combined in order to solve the above-mentioned problems or to achieve a part or all of the above-mentioned effects. In addition, unless described herein as essential, the technical features can be deleted as appropriate.

What is claimed is:

1. A method for manufacturing a membrane electrode and gas diffusion layer assembly, the method comprising:
   applying a catalyst ink including an ionomer to a second surface of an electrolyte membrane while conveying a first sheet in which a first surface of the electrolyte membrane is supported by a back sheet;
   drying the catalyst ink by blowing air vibrated with ultrasonic waves onto a surface of the catalyst ink to produce a second sheet in which a catalyst layer is provided on the second surface of the electrolyte membrane;
   forming a first roll by winding the second sheet; and
   producing a third sheet by stacking a gas diffusion layer on the catalyst layer and pressing the catalyst layer and the gas diffusion layer in a stacking direction as heating the catalyst layer and the gas diffusion layer to join the catalyst layer and the gas diffusion layer while conveying the second sheet unwound from the first roll.

2. The method according to claim 1, wherein after producing the third sheet, the back sheet is peeled off from the third sheet to form a fourth sheet, and the fourth sheet is wound into a roll shape to form a second roll.

3. The method according to claim 1, wherein an equivalent weight, which is a dry mass of electrolyte per 1 mol of sulfo group in the electrolyte membrane, of the electrolyte membrane is such a value that a first peel strength between the back sheet and the electrolyte membrane is smaller than a second peel strength between the catalyst layer and the gas diffusion layer.

* * * * *